United States Patent
Kang et al.

(10) Patent No.: US 12,006,462 B2
(45) Date of Patent: Jun. 11, 2024

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., ltd., Hebei (CN)

(72) Inventors: Sumin Kang, Hebei (CN); Zhian Liang, Hebei (CN); Kui Wang, Hebei (CN); Guoliang Yun, Hebei (CN); Wei Zhang, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 0 days.

(21) Appl. No.: 17/997,717

(22) PCT Filed: Aug. 25, 2020

(86) PCT No.: PCT/CN2020/110965
§ 371 (c)(1),
(2) Date: Nov. 1, 2022

(87) PCT Pub. No.: WO2021/253623
PCT Pub. Date: Dec. 23, 2021

(65) Prior Publication Data
US 2023/0303928 A1  Sep. 28, 2023

(30) Foreign Application Priority Data

Jun. 16, 2020  (CN) .......................... 202010550064.4

(51) Int. Cl.
*G02F 1/1333* (2006.01)
*C09K 19/30* (2006.01)
*C09K 19/34* (2006.01)

(52) U.S. Cl.
CPC ...... *C09K 19/3491* (2013.01); *C09K 19/3001* (2013.01); *C09K 19/3098* (2013.01); *C09K 19/3405* (2013.01); *C09K 2019/3408* (2013.01)

(58) Field of Classification Search
CPC ............ C09K 19/3491; C09K 19/3001; C09K 19/3059; C09K 19/3098; C09K 19/3405; C09K 2019/3408; G02F 1/1333
See application file for complete search history.

(56) References Cited

U.S. PATENT DOCUMENTS

| | | | | |
|---|---|---|---|---|
| 6,348,244 B1 * | 2/2002 | Miyazawa | ......... | C09K 19/3001 252/299.61 |
| 6,692,657 B1 * | 2/2004 | Kato | ...................... | C07C 25/24 570/135 |
| 10,519,377 B1 * | 12/2019 | Xing | ................... | C09K 19/3066 |
| 2023/0303928 A1 * | 9/2023 | Kang | ................. | C09K 19/3059 |

FOREIGN PATENT DOCUMENTS

| | | |
|---|---|---|
| CN | 1218451 A | 6/1999 |
| CN | 101407719 A | 4/2009 |
| CN | 104629771 A | 5/2015 |
| CN | 104817529 A | 8/2015 |
| CN | 107973766 A | 5/2018 |
| EP | 1026143 A1 | 8/2000 |
| WO | WO-98/23563 A1 | 6/1998 |

* cited by examiner

*Primary Examiner* — Geraldina Visconti
(74) *Attorney, Agent, or Firm* — MUNCY, GEISSLER, OLDS & LOWE, PC

(57) ABSTRACT

The present invention belongs to the technical field of liquid crystal materials, and in particular relates to a liquid crystal composition and a liquid crystal display element or liquid crystal display containing the liquid crystal composition. The present invention discloses a liquid crystal composition, comprising one or more compounds represented by Formula I, one or more compounds represented by Formula II, and one or more compounds represented by Formula III. The liquid crystal composition of the present invention has a large optical anisotropy and a small ratio of $\gamma_1/K_{11}$, and can be used for developing a liquid crystal display element or liquid crystal display with a low cell thickness and a fast response.

5 Claims, No Drawings

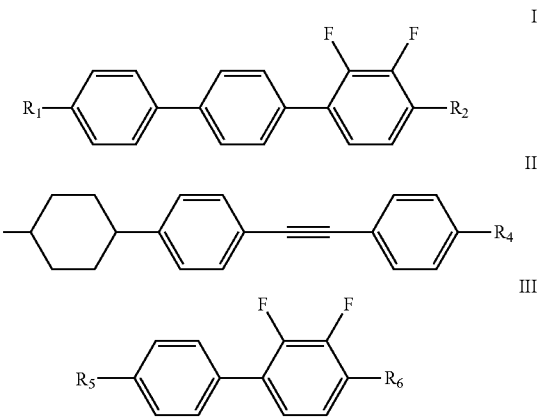

LIQUID CRYSTAL COMPOSITION, LIQUID CRYSTAL DISPLAY ELEMENT AND LIQUID CRYSTAL DISPLAY

TECHNICAL FIELD

The present invention belongs to the technical field of liquid crystal materials, and in particular relates to a liquid crystal composition and a liquid crystal display element and liquid crystal display containing the liquid crystal composition.

BACKGROUND ART

Liquid crystal display elements are divided into the following modes according to the display mode: twisted nematic (TN) mode, super twisted nematic (STN) mode, in-plane switching (IPS) mode, fringe-field switching (FFS) mode, vertical alignment (VA) mode, etc.

In early commercial TFT-LCD products, TN display mode is basically used; however, the biggest problem thereof is a narrow viewing angle. With the increase of the product size, especially in the field of TV, IPS display mode and VA display mode, which have wide viewing angles, have been successively developed and applied.

In addition, the liquid crystal media used in display elements of FFS mode, IPS mode, VA mode, etc. are intrinsically not perfect. For liquid crystal materials used in display devices, it is required to have the characteristics of (1) a low driving voltage: the liquid crystal materials have appropriate negative dielectric anisotropy and elastic coefficient K; (2) a fast response: the liquid crystal materials have appropriate rotational viscosity $\gamma_1$ and elastic coefficient K; and (3) a high reliability: a high charge retention rate, a high specific resistance value, excellent high-temperature stability, strict requirements on the stability to ultraviolet light (UV light) or conventional backlight illumination, etc. With the wide application of liquid crystal displays, the requirements for the performance thereof are also increasing. A high contrast ratio can significantly improve the performance of a display in terms of image definition, image details, gray level, etc. Although the delay ($\Delta$nd) design varies depending on the display mode, the delay design for the same display mode is basically the same in order to obtain the maximum penetration rate. By means of the design of a fixed delay, a better performance in terms of e.g. contrast ratio and viewing angle is obtained. The response speed of a liquid crystal display device is affected by the thickness (d) of the liquid crystal cell. The increase of the thickness of the liquid crystal cell weakens the overall control ability of an electric field on the twist of liquid crystal molecules, so the response speed of the liquid crystal display device can be improved by reducing the thickness of the liquid crystal cell on the premise of a constant delay.

Therefore, there is an urgent need for a liquid crystal composition with a large optical anisotropy and a small ratio of $\gamma_1/K_{11}$ for developing a liquid crystal display element or liquid crystal display with a low cell thickness and a fast response.

SUMMARY OF THE INVENTION

In order to solve the above-mentioned technical problems, the liquid crystal composition proposed by the present invention has a large optical anisotropy and a small ratio of $\gamma_1/K_{11}$.

To achieve the above object, the present invention uses the following technical solution:

The present invention provides a liquid crystal composition, characterized in that the liquid crystal composition comprises one or more compounds represented by Formula I, one or more compounds represented by Formula II, and one or more compounds represented by Formula III:

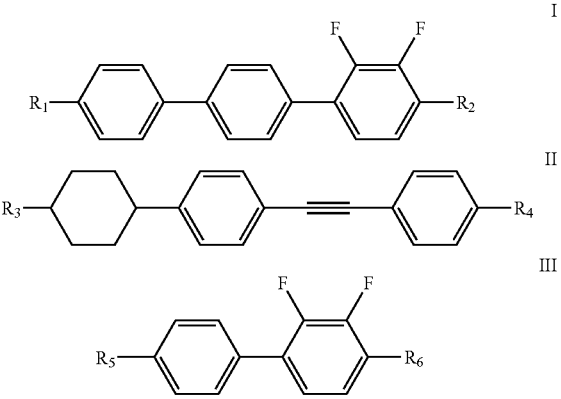

wherein
$R_1$, $R_2$, $R_3$, $R_4$, $R_5$ and $R_6$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8.

Further preferably, the liquid crystal composition comprises one or more compounds represented by Formula IV, and/or one or more compounds represented by Formula V:

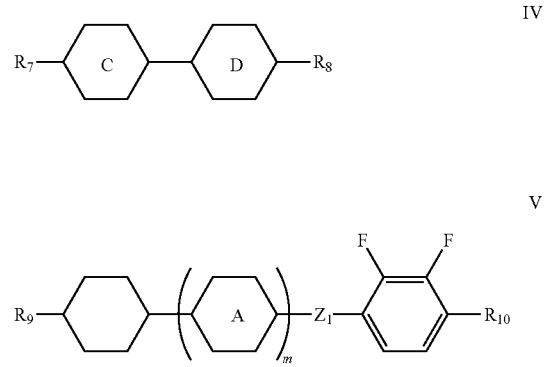

wherein
$R_7$ and $R_8$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

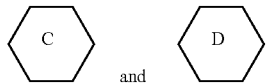

each independently represent 1,4-phenylene, 1,4-cyclohexylene or 1,4-cyclohexenylene.

$R_9$ and $R_{10}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8;

represents 1,4-phenylene, 1,4-cyclohexylene or 1,4-cyclohexenylene;

$Z_1$ represents a single bond or $-CH_2O-$;

m represents 0 or 1; and when m represents 0, $Z_1$ represents $-CH_2O-$.

In order to further improve the performance of the liquid crystal composition, the liquid crystal composition may further preferably comprises one or more compounds represented by Formula VI and/or one or more compounds represented by Formula VII:

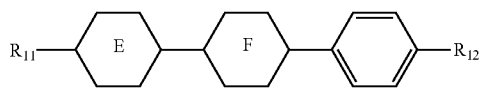

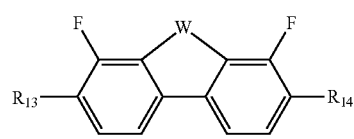

wherein $R_{11}$ and $R_{12}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

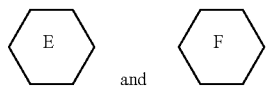

each independently represent 1,4-phenylene, 1,4-cyclohexylene or 1,4-cyclohexenylene.

$R_{13}$ and $R_{14}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8, and any one or more $-CH_2-$ in the groups represented by $R_{13}$ and $R_{14}$ are optionally replaced by cyclopentylene, cyclobutylene or cyclopropylene; and W represents $-O-$, $-S-$ or $-CH_2O-$.

The present invention further provides a liquid crystal display element comprising the liquid crystal composition of the present invention, wherein the liquid crystal display element is an active matrix addressing display element or a passive matrix addressing display element.

The present invention further provides a liquid crystal display comprising the liquid crystal composition of the present invention, wherein the liquid crystal display is an active matrix addressing display or a passive matrix addressing display.

Effects of the Invention

The liquid crystal composition of the present invention has a large optical anisotropy and a small ratio of $\gamma_1/K_{11}$ while maintaining an appropriate dielectric anisotropy and clearing point, and can be used for developing a liquid crystal display element or liquid crystal display with a low cell thickness and a fast response.

DETAILED DESCRIPTION OF EMBODIMENTS

[Liquid Crystal Composition]

The present invention provides a liquid crystal composition, characterized in that the liquid crystal composition comprises one or more compounds represented by Formula I, one or more compounds represented by Formula II, and one or more compounds represented by Formula III:

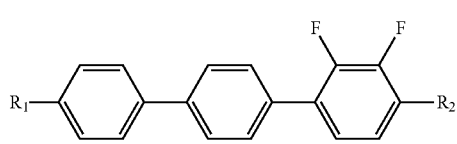

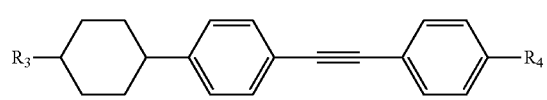

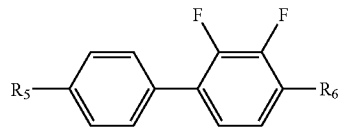

wherein
R₁, R₂, R₃, R₄, R₅ and R₆ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8.

The liquid crystal composition of the present invention has a large optical anisotropy and a small ratio of $\gamma_1/K_{11}$, and can be used for developing a liquid crystal display element or liquid crystal display with a low cell thickness and a fast response.

Preferably, in the liquid crystal composition of the present invention, the aforementioned compound represented by Formula I is selected from the group consisting of compounds represented by Formulas I-1 to I-12:

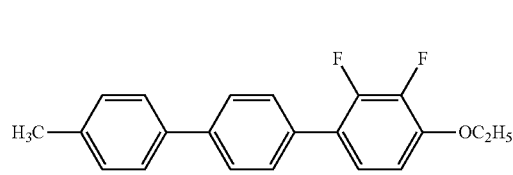
I-1

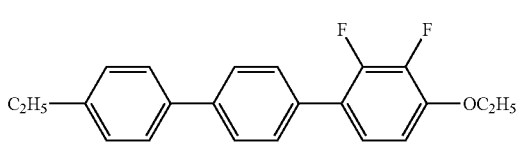
I-2

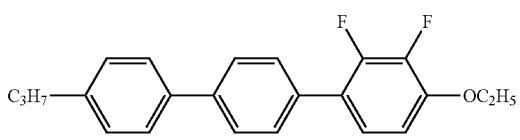
I-3

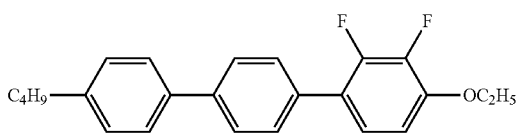
I-4

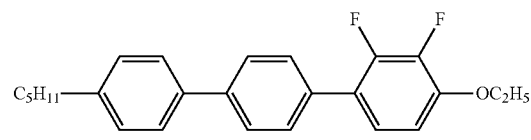
I-5

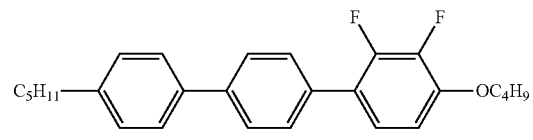
I-6

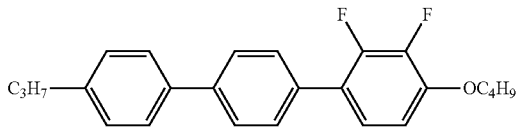
I-7

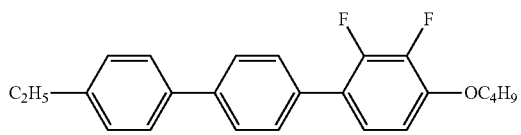
I-8

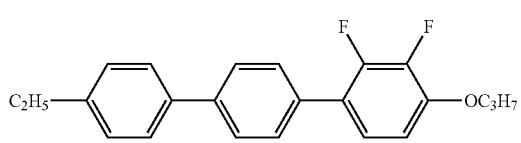
I-9

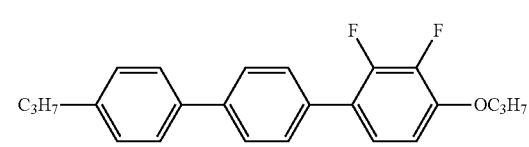
I-10

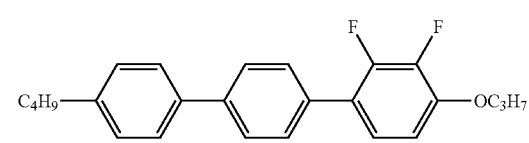
I-11

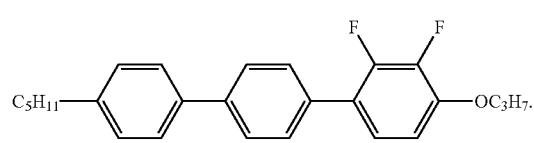
I-12

Further preferably, in the liquid crystal composition of the present invention, the aforementioned compound represented by Formula I is selected from the group consisting of compounds represented by Formulas I-1 to I-5:

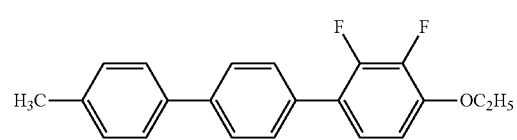
I-1

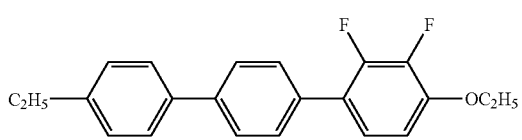
I-2

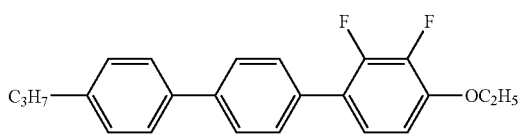
I-3

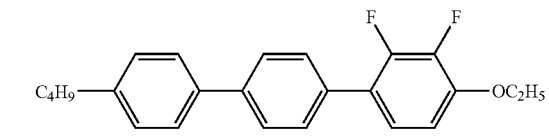
I-4

I-5

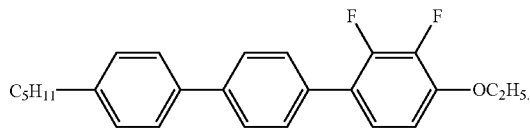

Preferably, in the liquid crystal composition of the present invention, the aforementioned compound represented by Formula II is selected from the group consisting of compounds represented by Formulas II-1 to II-10:

II-1

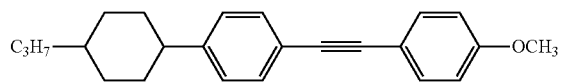

II-2

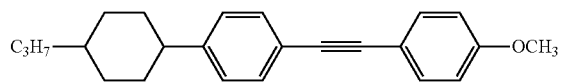

II-3

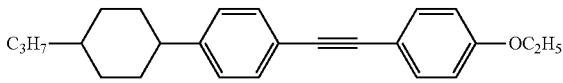

II-4

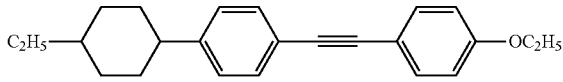

II-5

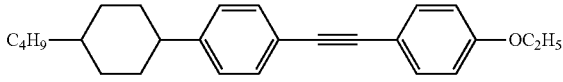

II-6

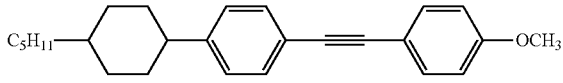

II-7

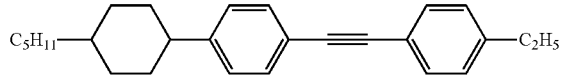

II-8

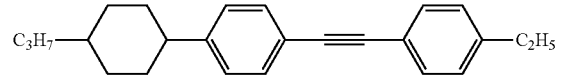

II-9

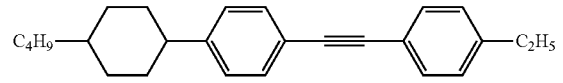

II-10

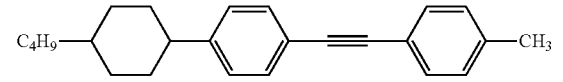

Further preferably, in the liquid crystal composition of the present invention, the aforementioned compound represented by Formula II is selected from the group consisting of compounds represented by Formulas II-2 to II-4 and II-6 to II-8:

II-2

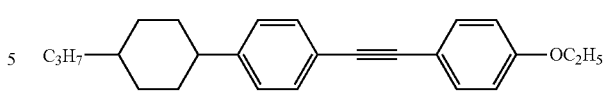

II-3

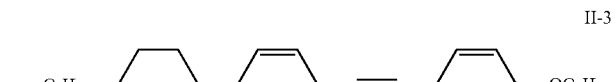

II-4

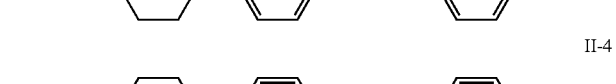

II-6

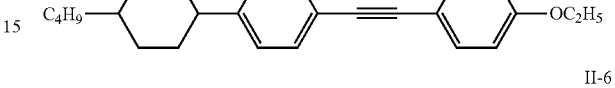

II-7

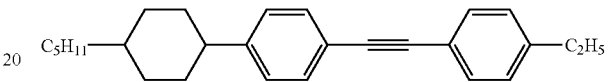

II-8

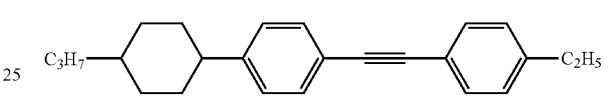

Preferably, in the liquid crystal composition of the present invention, the aforementioned compound represented by Formula III is selected from the group consisting of compounds represented by Formulas III-1 to III-6:

III-1

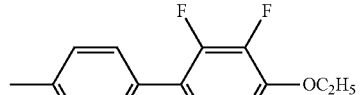

III-2

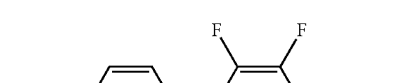

III-3

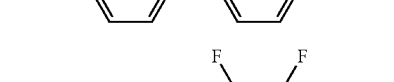

III-4

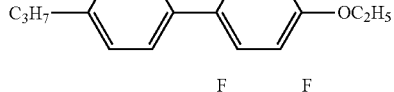

III-5

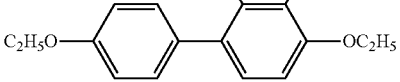

III-6

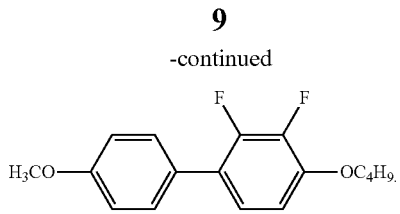

The liquid crystal composition of the present invention preferably further comprises one or more compounds represented by Formula IV:

IV

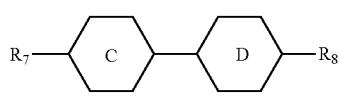

wherein $R_7$ and $R_8$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

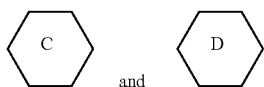

each independently represent 1,4-phenylene, 1,4-cyclohexylene or 1,4-cyclohexenylene.

Preferably, in the liquid crystal composition of the present invention, the aforementioned compound represented by Formula IV is selected from the group consisting of compounds represented by Formulas IV-1 to IV-17:

IV-1

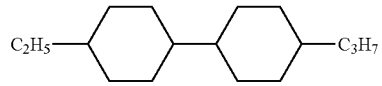

IV-2

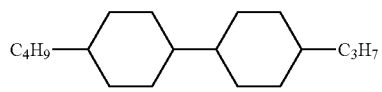

IV-3

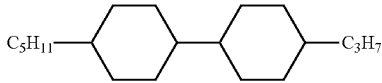

IV-4

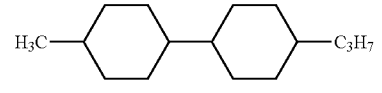

IV-5

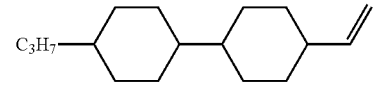

IV-6

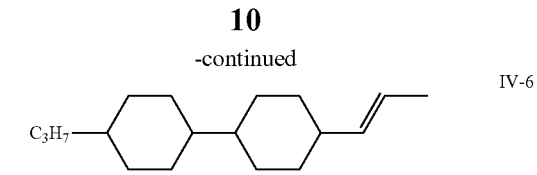

IV-7

IV-8

IV-9

IV-10

IV-11

IV-12

IV-13

IV-14

IV-15

IV-16

IV-17

Further preferably, in the liquid crystal composition of the present invention, the aforementioned compound represented by Formula IV is selected from the group consisting of compounds represented by Formulas IV-1 to IV-6:

IV-1

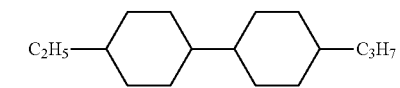

-continued

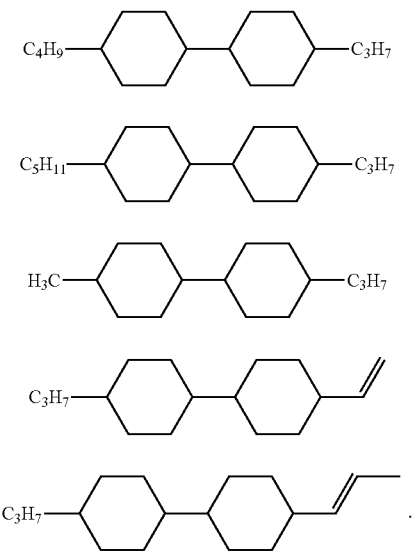

IV-2
IV-3
IV-4
IV-5
IV-6

The liquid crystal composition of the present invention preferably further comprises one or more compounds represented by Formula V:

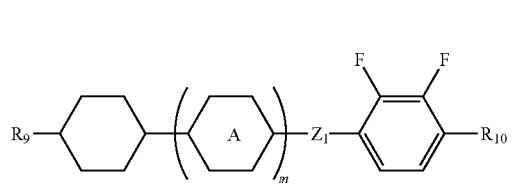

V wherein $R_9$ and $R_{10}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8;

represents 1,4-phenylene, 1,4-cyclohexylene or 1,4-cyclohexenylene;

$Z_1$ represents a single bond or —$CH_2O$—;

m represents 0 or 1; and when m represents 0, $Z_1$ represents —$CH_2O$—.

Preferably, in the liquid crystal composition of the present invention, the aforementioned compound represented by Formula V is selected from the group consisting of compounds represented by Formulas V-1 to V-5:

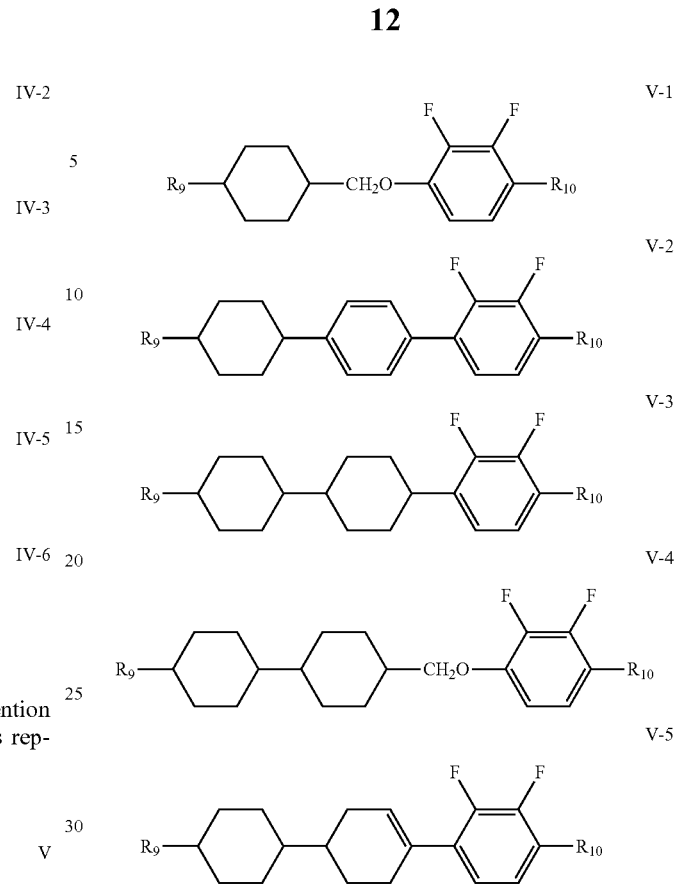

V-1
V-2
V-3
V-4
V-5 wherein $R_9$ and $R_{10}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8.

The liquid crystal composition of the present invention preferably further comprises one or more compounds represented by Formula VI:

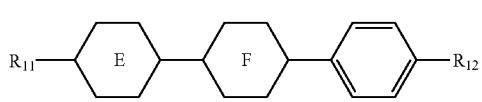

VI wherein $R_{11}$ and $R_{12}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

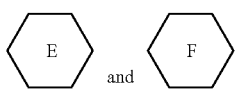

each independently represent 1,4-phenylene, 1,4-cyclohexylene or 1,4-cyclohexenylene.

Preferably, in the liquid crystal composition of the present invention, the aforementioned compound represented by Formula VI is selected from the group consisting of compounds represented by Formulas VI-1 to VI-3:

VI-1

VI-2

VI-3 wherein $R_{11}$ and $R_{12}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8.

The liquid crystal composition of the present invention preferably further comprises one or more compounds represented by Formula VII:

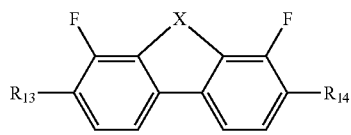

VII wherein
$R_{13}$ and $R_{14}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8, and any one or more —CH$_2$— in the groups represented by $R_{13}$ and $R_{14}$ are optionally replaced by cyclopentylene, cyclobutylene or cyclopropylene; and X represents —O—, —S— or —CH$_2$O—.

Preferably, in the liquid crystal composition of the present invention, the aforementioned compound represented by Formula VII is selected from the group consisting of compounds represented by Formulas VII-1 to VII-12:

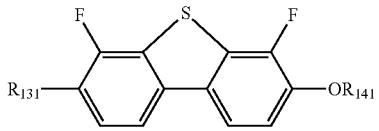

VII-1

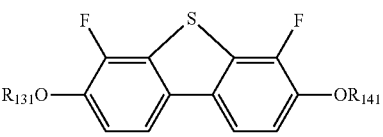

VII-2

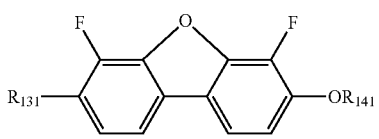

VII-3

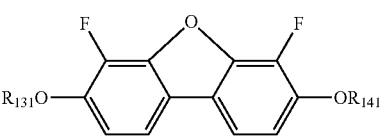

VII-4

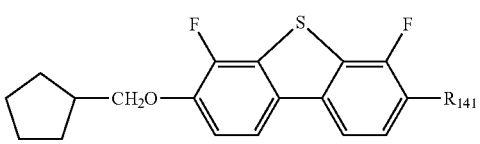

VII-5

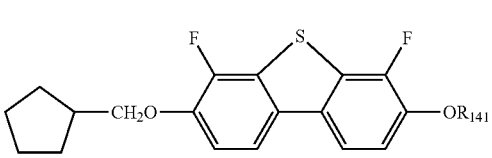

VII-6

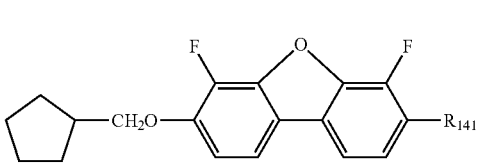

VII-7

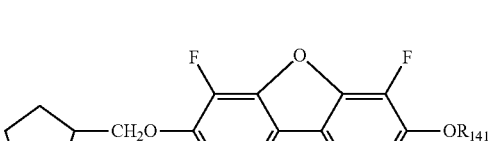

VII-8

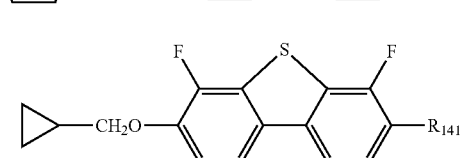

VII-9

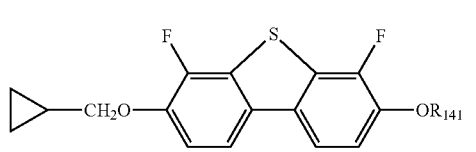

VII-10

-continued

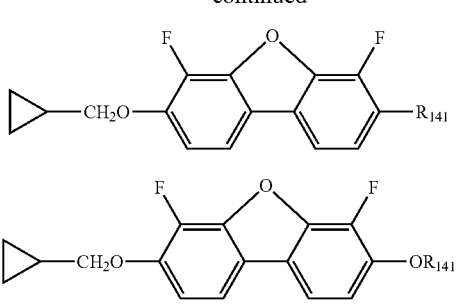

wherein $R_{131}$ and $R_{141}$ each independently represent an alkyl with a carbon atom number of 1-10.

As the aforementioned alkyl with a carbon atom number of 1-10, methyl, ethyl, n-propyl, isopropyl, n-butyl, isobutyl, tert-butyl, n-pentyl, isopentyl, hexyl, heptyl, octyl, nonyl, decyl, etc. can be listed by for example.

As the aforementioned alkoxy with a carbon atom number of 1-10, methoxy, ethoxy, n-propoxy, isopropoxy, n-butoxy, isobutoxy, pentoxy, hexyloxy, heptyloxy, octyloxy, nonoxy, decyloxy, etc. can be listed for example.

As the aforementioned alkenyl with a carbon atom number of 2-10, vinyl, 1-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, etc. can be listed for example.

In the aforementioned fluoro-substituted alkyl with a carbon atom number of 1-10, fluoro-substituted alkoxy with a carbon atom number of 1-10, fluoro-substituted alkenyl with a carbon atom number of 2-10, and fluoro-substituted alkenoxy with a carbon atom number of 3-8, the term "fluoro-substituted" can be monofluoro-substituted, or polyfluoro-substituted, such as difluoro-substituted and trifluoro-substituted, or may also be perfluoro-substituted, and there is no particular limitation on the number of the instances of fluorine substitution. For example, as the fluoro-substituted alkyl with a carbon atom number of 1-10, fluoromethyl, difluoromethyl, trifluoromethyl, 1-fluoroethyl, 2-fluoroethyl, 1,2-difluoroethyl, 1,1-difluoroethyl, 1,1,2-trifluoroethyl, 1,1,1,2,2-pentafluoro-substituted ethyl, etc. can be listed, for example, without limitation.

In the liquid crystal composition provided by the present invention, where the total mass of the liquid crystal composition is denoted as being 100%; if the liquid crystal composition only comprises the compounds represented by Formulas I and II, the total content of the compounds represented by Formulas I and II is denoted as being 100%.

Preferably, the liquid crystal composition comprises, by mass percentage:

preferably 1-14% by mass of a compound represented by Formula I, and further preferably 3-9% by mass of a compound represented by Formula I;

preferably 1-15% by mass of a compound represented by Formula II, and further preferably 3-10% by mass of a compound represented by Formula I;

preferably 3-27% by mass of a compound represented by Formula III, and further preferably 7-15% by mass of a compound represented by Formula III;

preferably 30-50% by mass of a compound represented by Formula IV, and further preferably 35-45% by mass of a compound represented by Formula IV;

preferably 10-40% by mass of a compound represented by Formula V, and further preferably 13-33% by mass of a compound represented by Formula V;

preferably 0-17% by mass of a compound represented by Formula VI, and further preferably 5-10% by mass of a compound represented by Formula VI; and preferably 0-15% by mass of a compound represented by Formula VII, and further preferably 5-10% by mass of a compound represented by Formula VII.

The mass percentage contents of the above-mentioned compounds represented by Formulas I to VII in the liquid crystal composition are only typical reference values for those skilled in the art to implement the technical solution of the present invention, rather than a specific limitation on the mass percentage content of each compound in the liquid crystal composition of the present invention. The scope of protection of the present invention is subject to the claims.

A variety of functional dopants may also be added to the liquid crystal composition of the present invention, and the content of the dopants is preferably 0.01% and 1% by mass. As the dopants, an antioxidant, an ultraviolet absorber and a chiral agent can be listed for example.

The antioxidant includes preferably

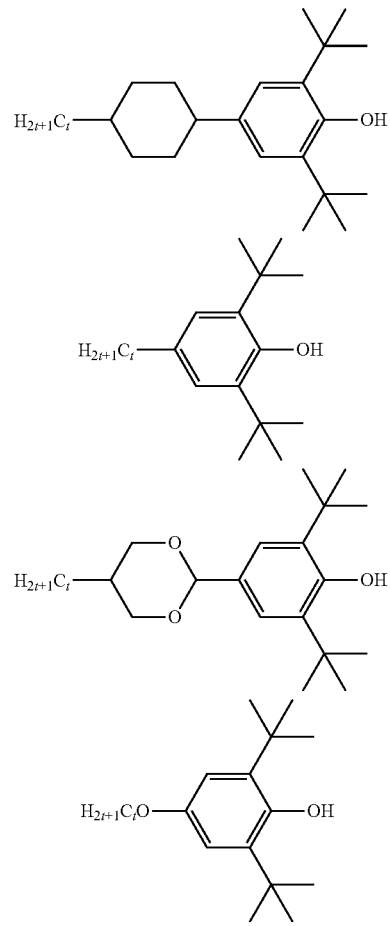

wherein t represents an integer from 1 to 10; and the chiral agent (levorotatory or dextrorotatory) includes preferably

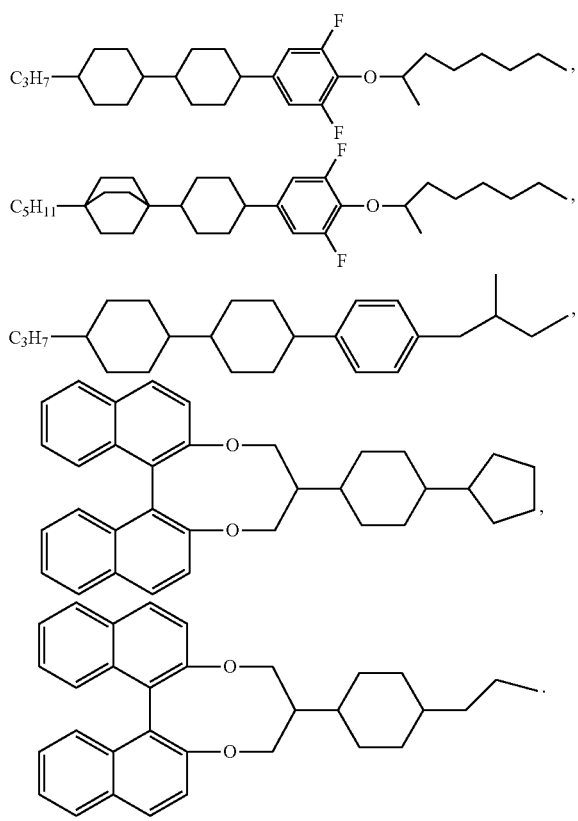

[Liquid Crystal Display Element or Liquid Crystal Display]

The present invention further relates to a liquid crystal display element or liquid crystal display comprising any one of the above-mentioned liquid crystal compositions; and the display element or display is an active matrix display element or display or a passive matrix display element or display.

The liquid crystal display element or liquid crystal display of the present invention is preferably an active matrix addressing liquid crystal display element or liquid crystal display.

As the aforementioned active matrix display element or display, TN-TFT or IPS-TFT or FFS-TFT or VA-TFT liquid crystal display elements or other TFT displays can be specifically listed for example.

The liquid crystal display element or liquid crystal display comprising the liquid crystal composition disclosed by the present invention has the characteristics of a low cell thickness and a fast response speed.

EXAMPLES

In order to explain the present invention more clearly, the present invention will be further explained below in conjunction with examples. A person skilled in the art should understand that the following detailed description is illustrative rather than restrictive, and should not limit the scope of protection of the present invention.

In the description, unless otherwise specified, the percentages all refer to mass percentages, the temperatures are degrees Celsius (° C.), and the specific meanings and test conditions of the other symbols are as follows:

Cp represents the clear point (° C.) of a liquid crystal, as measured by DSC quantitative method;

$\Delta n$ represents optical anisotropy, $n_o$ is the refractive index of ordinary light and $n_e$ is the refractive index of extraordinary light, and the test conditions are 25° C.±2° C., 589 nm, and Abbe refractometer test;

$\Delta\varepsilon$ represents dielectric anisotropy, $\Delta\varepsilon=\varepsilon_\parallel-\varepsilon_\perp$, wherein $\varepsilon_\parallel$ is the dielectric constant parallel to the molecular axis, and $\varepsilon_\perp$ is the dielectric constant perpendicular to the molecular axis, and the test conditions are 25° C.±0.5° C., 20 μm vertical cell, and INSTEC:ALCT-IR$_1$ test;

$\gamma_1$ represents rotational viscosity (mPa·s), and the test conditions are 25° C.±0.5° C., 20 μm vertical cell, and INSTEC:ALCT-IR$_1$ test;

$K_{11}$ is splay elastic constant, $K_{33}$ is bend elastic constant, and the test conditions are: 25° C., INSTEC:ALCT-IR$_1$, and 20 μm vertical cell; and the structures of the liquid crystal monomers in the examples of the present invention are represented by codes, and the code representation method for liquid crystal ring structures, terminal groups and linker groups is shown in Tables 1 and 2 below.

TABLE 1

Corresponding codes of ring structures

| Ring structure | Corresponding code |
|---|---|
| (cyclohexane) | C |
| (benzene) | P |
| (cyclohexene) | L |
| (fluorobenzene) | G |
| (fluorobenzene) | Gi |
| (difluorobenzene) | Y |
| (difluoro dibenzofuran) | Sb |

TABLE 1-continued

Corresponding codes of ring structures

| Ring structure | Corresponding code |
|---|---|
| (structure: dibenzothiophene with two F substituents) | Sc |

TABLE 2

Corresponding codes of terminal groups and linker groups

| Terminal groups and linker groups | Corresponding code |
|---|---|
| $C_nH_{2n+1}-$ | n- |
| $C_nH_{2n+1}O-$ | nO- |
| $-CF_3$ | -T |
| $-OCF_3$ | -OT |
| $-CH_2O-$ | -O- |
| $-F$ | -F |
| $-CH_2CH_2-$ | -E- |
| $-CH=CH-$ | -V- |
| $-CH=CH-C_nH_{2n+1}$ | Vn- |
| $-C\equiv C-$ | -W- |
| (cyclopentyl) | Cp- |
| (cyclopropyl) | Cpr- |
| (cyclopropylmethyl) | Cpr1- |
| (cyclopentylmethoxy) | CpO |
| (cyclopropylmethoxy) | CprO |

For example:

$C_4H_9-$(cyclohexyl)-(phenyl)-C≡C-(phenyl)-$OC_2H_5$, with the code being CPWP-4-O2;

$C_5H_{11}-$(cyclohexyl)-(phenyl)-C≡C-(phenyl)-$OC_2H_5$, with the code being CPWP-5-2;

(propyl-phenyl-phenyl(F)-phenyl-butenyl), with the code being PGP-3-2V;

$C_3H_7-$(phenyl)-(phenyl)-(phenyl with 2F)-$OC_2H_5$, with the code being PPY-3-O2;

$C_2H_5-$(cyclohexyl)-(phenyl)-(phenyl with 2F)-$OC_2H_5$, with the code being CPY-2-O2;

$C_3H_7-$(cyclohexyl)-(cyclohexyl)-(phenyl with 2F)-$OC_2H_5$, with the code being CCY-3-O2;

$C_3H_7-$(cyclohexyl)-$CH_2O-$(phenyl with 2F)-$OC_2H_5$, with the code being COY-3-O2;

$C_3H_7-$(cyclohexyl)-(cyclohexyl)-$CH_2O-$(phenyl with 2F)-$OC_2H_5$, with the code being CCOY-3-O2;

(cyclopentylmethoxy)-(dibenzofuran with 2F)-$OC_4H_9$, and with the code being Sb-CpO-O4;

(cyclopentylmethoxy)-(dibenzothiophene with 2F)-$OC_4H_9$, with the code being Sc-CpO-O4.

Example 1

The formula and corresponding properties of the liquid crystal compositions were as shown in Table 3 below.

TABLE 3

Formula and corresponding properties of the liquid crystal composition of Example 1

| Class | Code of liquid crystal monomer | Content (%) |
|---|---|---|
| I | PPY-5-O2 | 5 |
| I | PPY-3-O2 | 5.5 |
| II | CPWP-3-2 | 3 |
| II | CPWP-5-2 | 2 |
| III | PY-3-O2 | 9.5 |
| III | PY-1-O2 | 5 |

TABLE 3-continued

Formula and corresponding properties of the liquid crystal composition of Example 1

| Class | Code of liquid crystal monomer | Content (%) |
|---|---|---|
| IV | CC-3-V | 41 |
| V | CPY-3-O2 | 11.5 |
| V | COY-3-O2 | 7 |
| V | CCY-3-O2 | 10.5 |

Δε [1 KHz, 25° C.]: −2.6
Δn [589 nm, 25° C.]: 0.117
$K_{11}$: 13.9
$K_{33}$: 14.7
Cp: 81° C.
$\gamma_1$: 52 mPa · s
$\gamma_1/K_{11}$: 3.7

Example 2

The formula and corresponding properties of the liquid crystal compositions were as shown in Table 4 below.

TABLE 4

Formula and corresponding properties of the liquid crystal composition of Example 2

| Class | Code of liquid crystal monomer | Content (%) |
|---|---|---|
| I | PPY-5-O2 | 3 |
| I | PPY-3-O2 | 3.5 |
| I | PPY-3-O4 | 3.5 |
| I | PPY-5-O4 | 2 |
| II | CPWP-3-2 | 3 |
| III | PY-2O-O2 | 5 |
| III | PY-1-O2 | 3 |
| IV | CC-3-V | 35 |
| IV | CC-2-3 | 11 |
| V | CCY-3-O2 | 8 |
| V | CCY-5-O2 | 5 |
| V | CLY-3-O2 | 2 |
| V | CLY-4-O2 | 2 |
| VI | CPP-V-1 | 9 |
| VII | Sc-2O-O4 | 5 |

Δε [1 KHz, 25° C.]: −2.1
Δn [589 nm, 25° C.]: 0.112
$K_{11}$: 16.1
$K_{33}$: 16.5
Cp: 93° C.
$\gamma_1$: 63 mPa · s
$\gamma_1/K_{11}$: 3.9

Example 3

The formula and corresponding properties of the liquid crystal compositions were as shown in Table 5 below.

TABLE 5

Formula and corresponding properties of the liquid crystal composition of Example 3

| Class | Code of liquid crystal monomer | Content (%) |
|---|---|---|
| I | PPY-3-O2 | 3 |
| I | PPY-5-O2 | 5 |
| II | CPWP-3-O2 | 5 |
| II | CPWP-3-2 | 3.5 |
| III | PY-3-O2 | 9 |
| III | PY-1-O2 | 3 |
| IV | CC-3-V | 29 |
| IV | CC-2-3 | 7 |
| IV | PP-5-1 | 7 |

TABLE 5-continued

Formula and corresponding properties of the liquid crystal composition of Example 3

| Class | Code of liquid crystal monomer | Content (%) |
|---|---|---|
| V | CPY-3-O2 | 10.5 |
| V | CLY-3-O2 | 3 |
| V | CCOY-3-O2 | 7 |
| VII | Sb-4O-O4 | 3 |
| VII | Sc-2O-O4 | 5 |

Δε [1 KHz, 25° C.]: −2.9
Δn [589 nm, 25° C.]: 0.133
$K_{11}$: 15.1
$K_{33}$: 14.4
Cp: 82° C.
$\gamma_1$: 68 mPa · s
$\gamma_1/K_{11}$: 4.5

Example 4

The formula and corresponding properties of the liquid crystal compositions were as shown in Table 6 below.

TABLE 6

Formula and corresponding properties of the liquid crystal composition of Example 4

| Class | Code of liquid crystal monomer | Content (%) |
|---|---|---|
| I | PPY-5-O2 | 3 |
| I | PPY-3-O2 | 2.5 |
| II | CPWP-3-O2 | 5 |
| II | CPWP-3-2 | 3 |
| II | CPWP-3-O1 | 3 |
| III | PY-3-O2 | 7 |
| III | PY-2O-O4 | 3 |
| IV | CC-3-V | 19 |
| IV | CC-2-3 | 13.5 |
| IV | PP-5-1 | 7 |
| IV | CP-3-O2 | 2 |
| V | CPY-3-O2 | 6.5 |
| V | CCOY-3-O2 | 7 |
| VI | CPP-3-2 | 5 |
| VII | Sc-CpO-O4 | 7 |
| VII | Sb-CpO-O4 | 6.5 |

Δε [1 KHz, 25° C.]: −3.5
Δn [589 nm, 25° C.]: 0.136
$K_{11}$: 16.2
$K_{33}$: 13.0
Cp: 81° C.
$\gamma_1$: 76 mPa · s
$\gamma_1/K_{11}$: 4.7

Example 5

The formula and corresponding properties of the liquid crystal compositions were as shown in Table 7 below.

TABLE 7

Formula and corresponding properties of the liquid crystal composition of Example 5

| Class | Code of liquid crystal monomer | Content (%) |
|---|---|---|
| I | PPY-5-O2 | 3 |
| II | CPWP-3-O2 | 5 |
| II | CPWP-3-2 | 5 |
| II | CPWP-4-O2 | 2 |
| II | CPWP-3-O1 | 3 |
| III | PY-3-O2 | 7 |
| III | PY-2O-O2 | 5.5 |

TABLE 7-continued

Formula and corresponding properties of the
liquid crystal composition of Example 5

| Class | Code of liquid crystal monomer | Content (%) |
|---|---|---|
| IV | CC-3-V | 35 |
| IV | CC-3-V1 | 2.5 |
| IV | CC-2-3 | 3 |
| V | CPY-3-O2 | 7.5 |
| V | CCOY-3-O2 | 11.5 |
| VI | CPP-3-2 | 3 |
| VII | Sb-4O-O4 | 7 |

Δε [1 KHz, 25° C.]: −2.3
Δn [589 nm, 25° C.]: 0.128
$K_{11}$: 16.0
$K_{33}$: 15.8
Cp: 95° C.
$γ_1$: 78 mPa · s
$γ_1/K_{11}$: 4.8

Example 6

The formula and corresponding properties of the liquid crystal compositions were as shown in Table 8 below.

TABLE 8

Formula and corresponding properties of the
liquid crystal composition of Example 6

| Class | Code of liquid crystal monomer | Content (%) |
|---|---|---|
| I | PPY-3-O2 | 3 |
| I | PPY-5-O2 | 2 |
| II | CPWP-3-2 | 5 |
| III | PY-3-O2 | 5 |
| III | PY-1-O2 | 3 |
| IV | CC-3-V | 35 |
| V | CPY-3-O2 | 9 |
| V | COY-3-O2 | 11.5 |
| V | COY-3-O1 | 5 |
| V | CCOY-3-O2 | 7 |
| V | CLY-3-O2 | 3.5 |
| VI | CPP-3-2 | 9 |
| VI | CCP-V-1 | 2 |

Δε [1 KHz, 25° C.]: −2.7
Δn [589 nm, 25° C.]: 0.110
$K_{11}$: 13.3
$K_{33}$: 13.9
Cp: 80° C.
$γ_1$: 56 mPa · s
$γ_1/K_{11}$: 4.2

Example 7

The formula and corresponding properties of the liquid crystal compositions were as shown in Table 9 below.

TABLE 9

Formula and corresponding properties of the
liquid crystal composition of Example 7

| Class | Code of liquid crystal monomer | Content (%) |
|---|---|---|
| I | PPY-3-O2 | 2 |
| I | PPY-3-O4 | 2 |
| II | CPWP-3-2 | 2 |
| III | PY-3-O2 | 5 |
| IV | CC-3-V | 13 |
| IV | CC-2-3 | 15 |
| IV | PP-5-1 | 3 |
| V | COY-3-O2 | 13.5 |

TABLE 9-continued

Formula and corresponding properties of the
liquid crystal composition of Example 7

| Class | Code of liquid crystal monomer | Content (%) |
|---|---|---|
| V | CCOY-3-O2 | 9.5 |
| V | CPY-3-O2 | 7 |
| V | CLY-3-O2 | 3 |
| VI | CPP-3-2 | 7.5 |
| VI | CCP-V-1 | 8 |
| VII | Sc-CpO-O4 | 6.5 |
| VII | Sb-CpO-O4 | 3 |

Δε [1 KHz, 25° C.]: −4.2
Δn [589 nm, 25° C.]: 0.112
$K_{11}$: 15.1
$K_{33}$: 13.7
Cp: 79° C.
$γ_1$: 84 mPa · s
$γ_1/K_{11}$: 5.6

Example 8

The formula and corresponding properties of the liquid crystal compositions were as shown in Table 10 below.

TABLE 10

Formula and corresponding properties of the
liquid crystal composition of Example 8

| Class | Code of liquid crystal monomer | Content (%) |
|---|---|---|
| I | PPY-5-O2 | 2 |
| II | CPWP-3-2 | 3 |
| III | PY-3-O2 | 5.5 |
| III | PY-1-O2 | 2 |
| IV | CC-3-V | 37 |
| V | CPY-3-O2 | 11.5 |
| V | CCOY-3-O2 | 13.5 |
| V | COY-3-O2 | 3 |
| V | CLY-3-O2 | 5 |
| VI | CPP-3-2 | 3 |
| VI | CPP-1V-2 | 6.5 |
| VI | CCP-V-1 | 4 |
| VII | Sb-4O-O4 | 4 |

Δε [1 KHz, 25° C.]: −2.5
Δn [589 nm, 25° C.]: 0.113
$K_{11}$: 15.6
$K_{33}$: 17.3
Cp: 96° C.
$γ_1$: 74 mPa · s
$γ_1/K_{11}$: 4.7

Example 9

The formula and corresponding properties of the liquid crystal compositions were as shown in Table 11 below.

TABLE 11

Formula and corresponding properties of the
liquid crystal composition of Example 9

| Class | Code of liquid crystal monomer | Content (%) |
|---|---|---|
| I | PPY-5-O2 | 3.5 |
| II | CPWP-3-O2 | 5 |
| III | PY-2O-O2 | 3 |
| III | PY-1-O2 | 3.5 |
| IV | CC-3-V | 10.5 |
| IV | CC-2-3 | 25 |
| IV | CC-5-3 | 5 |
| IV | PP-5-1 | 7 |

TABLE 11-continued

Formula and corresponding properties of the
liquid crystal composition of Example 9

| Class | Code of liquid crystal monomer | Content (%) |
|---|---|---|
| V | CPY-3-O2 | 11.5 |
| V | CCOY-4-O2 | 7.5 |
| V | CLY-3-O2 | 3 |
| V | CLY-4-O2 | 2 |
| V | CCY-3-O2 | 7 |
| VI | CPP-5-2 | 6.5 |

$\Delta\varepsilon$ [1 KHz, 25° C.]: −2.6
$\Delta n$ [589 nm, 25° C.]: 0.115
$K_{11}$: 17.6
$K_{33}$: 16.6
Cp: 93° C.
$\gamma_1$: 88 mPa · s
$\gamma_1/K_{11}$: 5.0

Example 10

The formula and corresponding properties of the liquid crystal compositions were as shown in Table 12 below.

TABLE 12

Formula and corresponding properties of the
liquid crystal composition of Example 10

| Class | Code of liquid crystal monomer | Content (%) |
|---|---|---|
| I | PPY-5-O2 | 5 |
| I | PPY-3-O2 | 3 |
| I | PPY-3-O4 | 3.5 |
| II | CPWP-3-2 | 5 |
| II | CPWP-4-O2 | 2 |
| II | CPWP-3-O1 | 2 |
| III | PY-3-O2 | 13.5 |
| III | PY-2O-O2 | 5 |
| III | PY-2O-O4 | 7 |
| IV | CC-3-V | 35 |
| IV | CC-2-3 | 7.5 |
| V | CPY-3-O2 | 11.5 |

$\Delta\varepsilon$ [1 KHz, 25° C.]: −2.5
$\Delta n$ [589 nm, 25° C.]: 0.131
$K_{11}$: 14.3
$K_{33}$: 13.7
Cp: 79° C.
$\gamma_1$: 56 mPa · s
$\gamma_1/K_{11}$: 4.0

Example 11

The formula and corresponding properties of the liquid crystal compositions were as shown in Table 13 below.

TABLE 13

Formula and corresponding properties of the
liquid crystal composition of Example 11

| Class | Code of liquid crystal monomer | Content (%) |
|---|---|---|
| I | PPY-5-O2 | 3 |
| I | PPY-3-O2 | 3 |
| I | PPY-3-O4 | 3 |
| II | CPWP-3-2 | 3.5 |
| III | PY-3-O2 | 7.5 |
| III | PY-2O-O4 | 3 |
| III | PY-2O-O2 | 5 |
| IV | CC-3-V | 25 |
| IV | CC-2-3 | 13.5 |
| V | CPY-3-O2 | 11.5 |

TABLE 13-continued

Formula and corresponding properties of the
liquid crystal composition of Example 11

| Class | Code of liquid crystal monomer | Content (%) |
|---|---|---|
| V | CCOY-3-O2 | 11 |
| V | CLY-3-O2 | 3.5 |
| VI | CPP-3-2V1 | 7.5 |

$\Delta\varepsilon$ [1 KHz, 25° C.]: −3.0
$\Delta n$ [589 nm, 25° C.]: 0.125
$K_{11}$: 17.0
$K_{33}$: 18.8
Cp: 95° C.
$\gamma_1$: 86 mPa · s
$\gamma_1/K_{11}$: 5.0

Example 12

The formula and corresponding properties of the liquid crystal compositions were as shown in Table 14 below.

TABLE 14

Formula and corresponding properties of the
liquid crystal composition of Example 12

| Class | Code of liquid crystal monomer | Content (%) |
|---|---|---|
| I | PPY-5-O2 | 2.5 |
| I | PPY-3-O2 | 2.5 |
| II | CPWP-3-2 | 3 |
| III | PY-3-O2 | 9.5 |
| III | PY-2O-O2 | 5 |
| III | PY-2O-O4 | 7 |
| III | PY-1-O2 | 3 |
| IV | CC-3-V | 30 |
| IV | CC-2-3 | 9.5 |
| V | CPY-3-O2 | 13.5 |
| VI | CPP-1V-2 | 7 |
| VII | Sb-CpO-O4 | 7.5 |

$\Delta\varepsilon$ [1 KHz, 25° C.]: −3.2
$\Delta n$ [589 nm, 25° C.]: 0.126
$K_{11}$: 13.0
$K_{33}$: 12.7
Cp: 70° C.
$\gamma_1$: 55 mPa · s
$\gamma_1/K_{11}$: 4.2

Comparative Example 1

The formula and corresponding properties of the liquid crystal compositions were as shown in Table 15 below.

TABLE 15

Formula and corresponding properties of the liquid
crystal composition of Comparative Example 1

| Class | Code of liquid crystal monomer | Content (%) |
|---|---|---|
|  | PGiY-3-O2 | 5 |
| II | CPWP-3-2 | 5 |
| III | PY-3-O2 | 5 |
| III | PY-1-O2 | 3 |
| IV | CC-3-V | 35 |
| V | CPY-3-O2 | 9 |
| V | COY-3-O2 | 11.5 |
| V | COY-3-O1 | 5 |

TABLE 15-continued

Formula and corresponding properties of the liquid
crystal composition of Comparative Example 1

| Class | Code of liquid crystal monomer | Content (%) |
|---|---|---|
| V | CCOY-3-O2 | 7 |
| V | CLY-3-O2 | 3.5 |
| VI | CPP-3-2 | 9 |
| VI | CCP-V-1 | 2 |

Δε [1 KHz, 25° C.]: −2.6
Δn [589 nm, 25° C.]: 0.108
$K_{11}$: 12.8
$K_{33}$: 13.8
Cp: 77° C.
$\gamma_1$: 59 mPa · s
$\gamma_1/K_{11}$: 4.6

The compound represented by Formula I in Example 6 was replaced by PGiY-3-O2, as Comparative Example 1.

Comparative Example 2

The formula and corresponding properties of the liquid crystal compositions were as shown in Table 16 below.

TABLE 16

Formula and corresponding properties of the liquid
crystal composition of Comparative Example 2

| Class | Code of liquid crystal monomer | Content (%) |
|---|---|---|
| I | PPY-3-O2 | 3 |
| I | PPY-5-O2 | 2 |
|  | CGPC-3-3 | 5 |
| III | PY-3-O2 | 5 |
| III | PY-1-O2 | 3 |
| IV | CC-3-V | 35 |
| V | CPY-3-O2 | 9 |
| V | COY-3-O2 | 11.5 |
| V | COY-3-O1 | 5 |
| V | CCOY-3-O2 | 7 |
| V | CLY-3-O2 | 3.5 |
| VI | CPP-3-2 | 9 |
| VI | CCP-V-1 | 2 |

Δε [1 KHz, 25° C.]: −2.7
Δn [589 nm, 25° C.]: 0.105
$K_{11}$: 13.1
$K_{33}$: 14.5
Cp: 82° C.
$\gamma_1$: 61 mPa · s
$\gamma_1/K_{11}$: 4.7

The compound represented by Formula II in Example 6 was replaced by CGPC-3-3, as Comparative Example 2.

Comparative Example 3

The formula and corresponding properties of the liquid crystal compositions were as shown in Table 17 below.

TABLE 17

Formula and corresponding properties of the liquid
crystal composition of Comparative Example 3

| Class | Code of liquid crystal monomer | Content (%) |
|---|---|---|
| I | PPY-3-O2 | 3 |
| I | PPY-5-O2 | 2 |
| II | CPWP-3-2 | 5 |
|  | CY-3-O2 | 5 |
|  | CY-1-O2 | 3 |

TABLE 17-continued

Formula and corresponding properties of the liquid
crystal composition of Comparative Example 3

| Class | Code of liquid crystal monomer | Content (%) |
|---|---|---|
| IV | CC-3-V | 35 |
| V | CPY-3-O2 | 9 |
| V | COY-3-O2 | 11.5 |
| V | COY-3-O1 | 5 |
| V | CCOY-3-O2 | 7 |
| V | CLY-3-O2 | 3.5 |
| VI | CPP-3-2 | 9 |
| VI | CCP-V-1 | 2 |

Δε [1 KHz, 25° C.]: −2.5
Δn [589 nm, 25° C.]: 0.104
$K_{11}$: 13.0
$K_{33}$: 13.7
Cp: 80° C.
$\gamma_1$: 60 mPa · s
$\gamma_1/K_{11}$: 4.6

The compound represented by Formula III in Example 6 was replaced by CY-3-O2 and CY-3-O1, as Comparative Example 3.

Comparative Example 4

The formula and corresponding properties of the liquid crystal compositions were as shown in Table 18 below.

TABLE 18

Formula and corresponding properties of the liquid
crystal composition of Comparative Example 4

| Class | Code of liquid crystal monomer | Content (%) |
|---|---|---|
|  | PGiY-3-O2 | 3 |
|  | PGiY-5-O2 | 2 |
|  | CGPC-3-3 | 5 |
|  | CY-3-O2 | 5 |
|  | CY-1-O2 | 3 |
| IV | CC-3-V | 35 |
| V | CPY-3-O2 | 9 |
| V | COY-3-O2 | 11.5 |
| V | COY-3-O1 | 5 |
| V | CCOY-3-O2 | 7 |
| V | CLY-3-O2 | 3.5 |
| VI | CPP-3-2 | 9 |
| VI | CCP-V-1 | 2 |

Δε [1 KHz, 25° C.]: −2.6
Δn [589 nm, 25° C.]: 0.098
$K_{11}$: 12.4
$K_{33}$: 14.6
Cp: 81° C.
$\gamma_1$: 64 mPa · s
$\gamma_1/K_{11}$: 5.2

Comparative Example 4 did not comprise the compounds represented by Formulas I, II and III of the present invention.

Compared with Comparative Examples 1, 2, 3 and 4, the liquid crystal composition examples of the present invention had a large optical anisotropy and a small $\gamma_1/K_{11}$ while maintaining a proper dielectric anisotropy and an appropriate clearing point, and could be used for developing a liquid crystal display element or liquid crystal display with a low cell thickness and a fast response.

The liquid crystal composition of the present invention had a large optical anisotropy and a small $\gamma_1/K_{11}$ while maintaining an appropriate dielectric anisotropy and clearing point, and could be used for developing a liquid crystal display element or liquid crystal display with a low cell thickness and a fast response.

The above examples disclosed by the present invention are only to clearly illustrate the instances of the present invention, rather than defining the embodiments of the present invention. For those of ordinary skill in the art, other different forms of changes or variations can also be made on the basis of the above description. It is impossible to exhaustively list all the embodiments here, and all obvious changes or variations that are derived from the technical solution of the present invention are still within the scope of protection of the present invention.

The invention claimed is:

1. A liquid crystal composition, comprising one or more compounds represented by Formula I, one or more compounds represented by Formula II, one or more compounds represented by Formula III, one or more compounds represented by Formula IV, one or more compounds represented by Formula V, one or more compounds represented by Formula VI, and a compound represented by Formula VII-2 or VII-4:

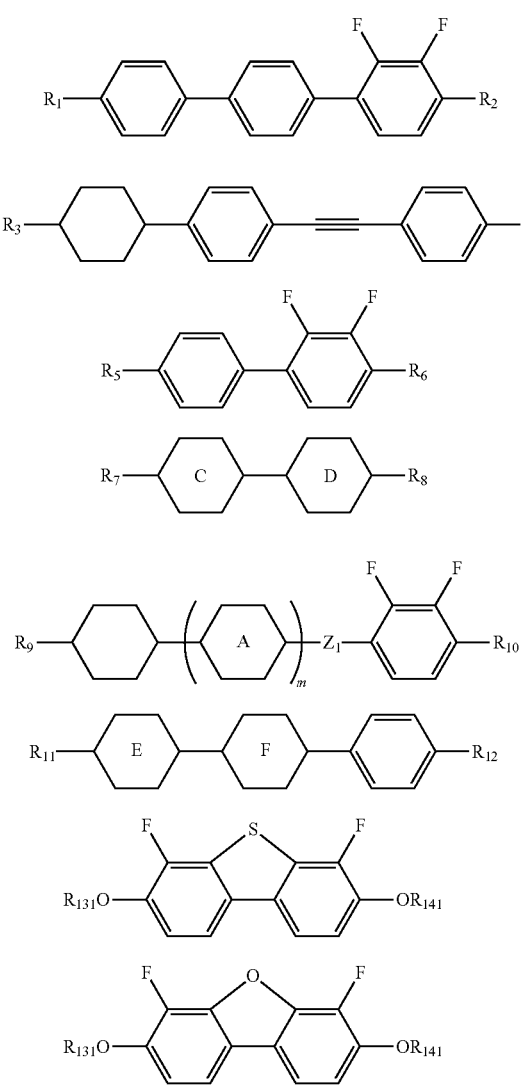

wherein
$R_1$, $R_2$, $R_3$, $R_4$, $R_5$ and $R_6$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8;

$R_7$ and $R_8$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8;

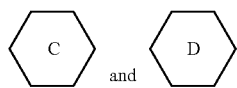

each independently represent 1,4-phenylene, 1,4-cyclohexylene or 1,4-cyclohexenylene;

$R_9$ and $R_{10}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8;

represents 1,4-phenylene, 1,4-cyclohexylene or 1,4-cyclohexenylene;

$Z_1$ represents a single bond or —CH$_2$O—;

m represents 0 or 1; and when m represents 0, $Z_1$ represents —CH$_2$O—;

$R_{11}$ and $R_{12}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8;

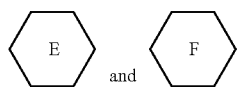

each independently represent 1,4-phenylene, 1,4-cyclohexylene or 1,4-cyclohexenylene;

$R_{131}$ and $R_{141}$ each independently represent an alkyl with a carbon atom number of 1-10; and a mass content of the compound represented by Formula II is 3-10%; a mass percentage content of the compound represented by Formula III is 7-15%; a mass content of the compound represented by Formula V is 13-33%; a mass content of the compound shown in the Formula VI is 5-10%; a mass content of the compound shown in the Formula VII-2 or VII-4 is 5-10%.

2. The liquid crystal composition according to claim 1, wherein the compound represented by Formula V is selected from the group consisting of compounds represented by Formulas V-1 to V-5:

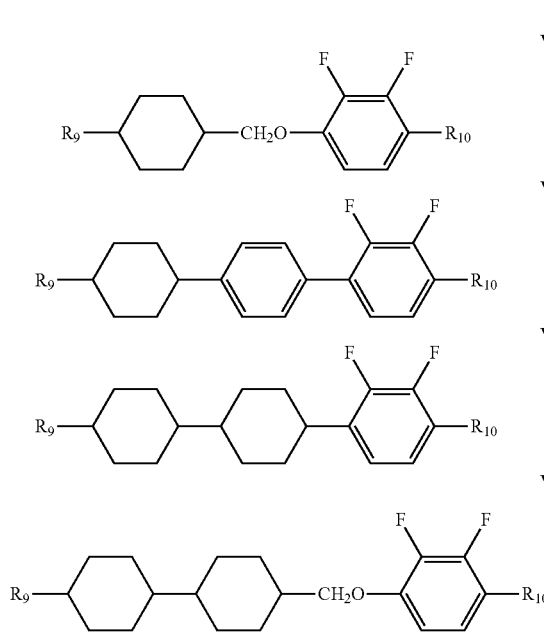

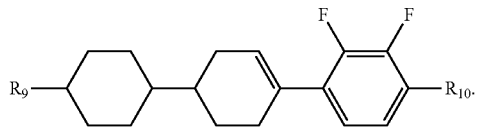

3. The liquid crystal composition according to claim 1, wherein the compound represented by Formula VI is selected from the group consisting of compounds represented by Formulas VI-1 to VI-3:

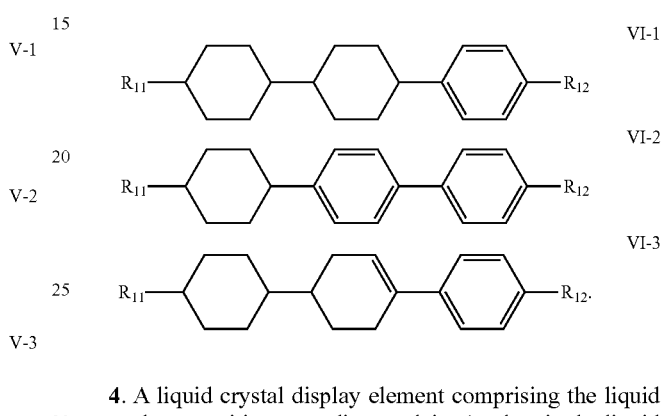

4. A liquid crystal display element comprising the liquid crystal composition according to claim 1, wherein the liquid crystal display element is an active matrix addressing liquid crystal display element, or a passive matrix addressing liquid crystal display element.

5. A liquid crystal display comprising the liquid crystal composition according to claim 1, wherein the liquid crystal display is an active matrix addressing liquid crystal display, or a passive matrix addressing liquid crystal display.

* * * * *